(12) United States Patent
Pinto et al.

(10) Patent No.: US 6,209,964 B1
(45) Date of Patent: Apr. 3, 2001

(54) DUMP TRUCK VIBRATOR

(76) Inventors: Jose Pinto; Leia Pinto, both of P.O. Box 9, Hickman, CA (US) 95323

( * ) Notice: Subject to any disclaimer, the term of this patent is extended or adjusted under 35 U.S.C. 154(b) by 0 days.

(21) Appl. No.: 09/262,168

(22) Filed: Mar. 3, 1999

(51) Int. Cl.$^7$ ........................................ B60P 1/00
(52) U.S. Cl. ................................ 298/1 V; 414/317
(58) Field of Search ..................... 298/1 V; 414/317, 414/415

(56) References Cited

U.S. PATENT DOCUMENTS

| | | |
|---|---|---|
| 1,820,320 | 8/1931 | Pickop . |
| 3,003,733 | 10/1961 | Peterson . |
| 3,106,652 | 10/1963 | Burt . |
| 3,343,876 | 9/1967 | Rapp . |
| 3,363,806 | 1/1968 | Blakeslee et al. . |
| 3,400,770 * | 9/1968 | Matson ........................ 173/32 |
| 3,408,872 | 11/1968 | Simmons et al. . |
| 3,408,876 | 11/1968 | Andrews . |
| 3,438,677 | 4/1969 | Redpath . |
| 3,485,401 | 12/1969 | Meyer . |
| 3,602,103 * | 8/1971 | Powers ........................ 91/443 |
| 3,625,295 * | 12/1971 | Gunning ........................ 173/15 |
| 3,731,907 | 5/1973 | Lash . |
| 3,747,980 | 7/1973 | Hansen . |
| 3,879,018 | 4/1975 | Hunter . |
| 4,175,906 | 11/1979 | Johnston et al. . |
| 4,522,500 | 6/1985 | Hyer . |
| 5,320,187 * | 6/1994 | Pressley et al. ................ 173/15 |
| 5,779,427 * | 7/1998 | Heffinger ....................... 414/375 |

FOREIGN PATENT DOCUMENTS

| | | |
|---|---|---|
| 5-85249 | 4/1993 | (JP) . |
| 763-163 | 9/1980 | (SU) . |
| 1180-279 | 9/1985 | (SU) . |
| 1291-465 | 2/1987 | (SU) . |
| 1657-423 | 6/1991 | (SU) . |

\* cited by examiner

*Primary Examiner*—D. Glenn Dayoan
*Assistant Examiner*—Scott Carpenter
(74) *Attorney, Agent, or Firm*—Charles L. Thoeming

(57) ABSTRACT

An apparatus for facilitating removing cargo from a dump truck. A plurality of air hammers are strategically located on an underside of a cargo bed of a dump truck and placed in operative communication with an on board air source carried by the dump truck. Energization of the air hammers facilitate dumping the load.

15 Claims, 4 Drawing Sheets

DUMP TRUCK VIBRATOR

FIELD OF THE INVENTION

The following invention relates generally to devices which help remove material which adheres to the bottom and side walls of the cargo carrying bed on the dump truck.

BACKGROUND OF THE INVENTION

The use of vibration in order to facilitate migration of materials has long been known. It is also known to provide vibrators on the underside of vehicles under the payload area in order to allow the material in the dump truck body portion to be slid off of the truck, particularly when the payload has a high coefficient of friction or tends to clump.

The following prior art reflects the state of the art of which applicants are aware and is included herewith to discharge applicants' acknowledged duty to disclose relevant prior art. It is stipulated, however, that none of these references teach singly nor render obvious when considered in any conceivable combination the nexus of the instant invention without invention having taken place.

| PATENT NO. | ISSUE DATE | INVENTOR |
| --- | --- | --- |
| 1,820,320 | August 25, 1931 | Pickop |
| 3,106,652 | October 8, 1963 | Burt |
| 3,003,733 | October 10, 1961 | Peterson |
| 3,343,876 | September 26, 1967 | Rapp |
| 3,363,806 | January 16, 1968 | Blakeslee, et al. |
| 3,408,872 | November 5, 1968 | Simmons, et al. |
| 3,408,876 | November 5, 1968 | Andrews |
| 3,438,677 | April 15, 1969 | Redpath |
| 3,485,401 | December 23, 1969 | Meyer |
| 3,731,907 | May 8, 1973 | Lash |
| 3,747,980 | July 24, 1973 | Hansen |
| 3,879,018 | April 22, 1975 | Hunter |
| 4,175,906 | November 27, 1979 | Johnston, et al. |
| SU 763-163 | September 18, 1980 | Greben |
| 4,522,500 | June 11, 1985 | Hyer |
| SU 1180-279-A | September 23, 1985 | Vniistroidormash |
| SU 1291-465-A | February 23, 1987 | Tashk |
| SU 1657-423-A | June 23, 1991 | Timokhin |
| 5-85249 | June 14, 1991 | Katayama |

For example, the patent to Lash teaches the use of a bin or hopper vibrator system. The vibrator is an unidirectional pneumatic vibrator which includes a sleeve member having a tapered bore therein for positioning upon a correspondingly tapered pin member. An adapter unit is provided which may be affixed to a surface to be vibrated, and which includes a pin member having a taper corresponding to the taper of the bore in the sleeve of the vibrator.

The patent to Redpath teaches the use of a vibrator for dumping vehicles. The vibrator comprises an electric motor controlled from the cab of the truck which drives a shaft having an eccentric weight thereon. The shaft is mounted in a pair of bearings. When the vehicle is in dumping position the vibrator is run in order to loosen material that adheres to the bottom or sides of the cargo area.

The patent to Hansen teaches the use of a vibrator for dump trucks. A vibrator for the box of a dump truck is formed with an elongated square tube containing apertured plates with the first plate at one end of the tube, the second plate adjacent to the other end of the tube and the third plate between the other two and nearer to the first plate. Bolted to the outer face of the first plate is an electric motor with its shaft projecting through the aperture in the first plate and connected to the first shaft with a flexible coupling whereby actuation of the motor will vibrate the box of the dump truck.

The patent to Johnston, et al., teaches the use of a vibrator for a dumping vehicle. The vibrator includes a pressure relief valve, when the valve opens, hydraulic fluid is pumped to a hydraulic motor which drives a vibrator which is bolted to the dump body. The vibrator loosens the material being dumped and prepares it to slide out of the body at its natural dumping angle.

The other prior art listed above but not specifically described teach other devices which further catalog the prior art of which the applicant is aware. These references appear more remote on their face from the references specifically discussed above.

SUMMARY OF THE INVENTION

The instant invention is distinguished over the known prior art in the multiplicity of ways. For example, applicants' novel use of an air driven vibrating system benefits from the air compressor hardware already on board the vehicle in practically all dump-type trucks. As a consequence, the device according to the present invention allows for ready retrofit without onerous retrofitting and finding clearance for other types of drive instrumentalities, such as electric or hydraulic drives.

By tapping into the pre-existing air compressor on the dump truck, retrofitting can proceed with maximum dispatch by routing air lines to strategic locations on the underside of the dump trucks cargo area and provide a suitable control in the air line for actuating an air hammer.

Applicants have modified a commercially available, hand-held, trigger operated air hammer to compactly nest adjacent an underside of the cargo area. The hammer is supported securely preferably adjacent the forwardmost portion of the cargo area and slightly inboard. Routing the air line to the source of compressed air commonly found adjacent the engine of the dump truck and providing an in-line air switch allows the device to economically and expeditiously be retrofitted on an existing dump truck.

OBJECTS OF THE INVENTION

Accordingly, the primary objection of the present invention is to provide a new and novel air vibrator for use on a cargo area of a dump truck.

A further object of the present invention is to provide a device as characterized above which is easily retrofitted to commercially available dump trucks by merely tapping into the pre-existing source of compressed air, and routing an air line to air hammers strategically located on an underside of the cargo area of the dump truck.

A further object of the present invention is to provide a present device as characterized above which is extremely durable in construction and safe to use.

A further object of the present invention is to provide a device as characterized above which can be integrated during the course of initial manufacture of the dump truck or can be easily retrofitted as a kit.

Viewed from a first vantage point it is an object of the present invention to provide a kit for installation on a dump truck to facilitate the removal of cargo from a cargo bed of the dump truck comprising, in combination: an air line communicating from a source of air to an underside of the cargo bed, a support located on the underside of the cargo bed, air hammer means deployed between the support and a bottom face of the cargo bed, and means for directing air to the air hammer means.

Viewed from a second vantage point it is an object of the present invention to provide a method for removing material from a dump truck, the steps coupling the air hammer to a source of compressed air on the dump truck, and activating the air hammer to dislodge contents within the cargo bed after elevating the cargo bed and releasing a confining gate of the cargo bed.

Viewed from a third vantage point it is an object of the present invention to provide a dump truck comprising, in combination: a source of air, an air vibrator located under a dump truck bed, and means for activating the air vibrator to remove cargo from said bed.

These and other objects will be made manifest when considering the following detailed specification when taken in conjunction with the appended drawing figures.

DESCRIPTION OF PREFERRED EMBODIMENTS

Figure 1:
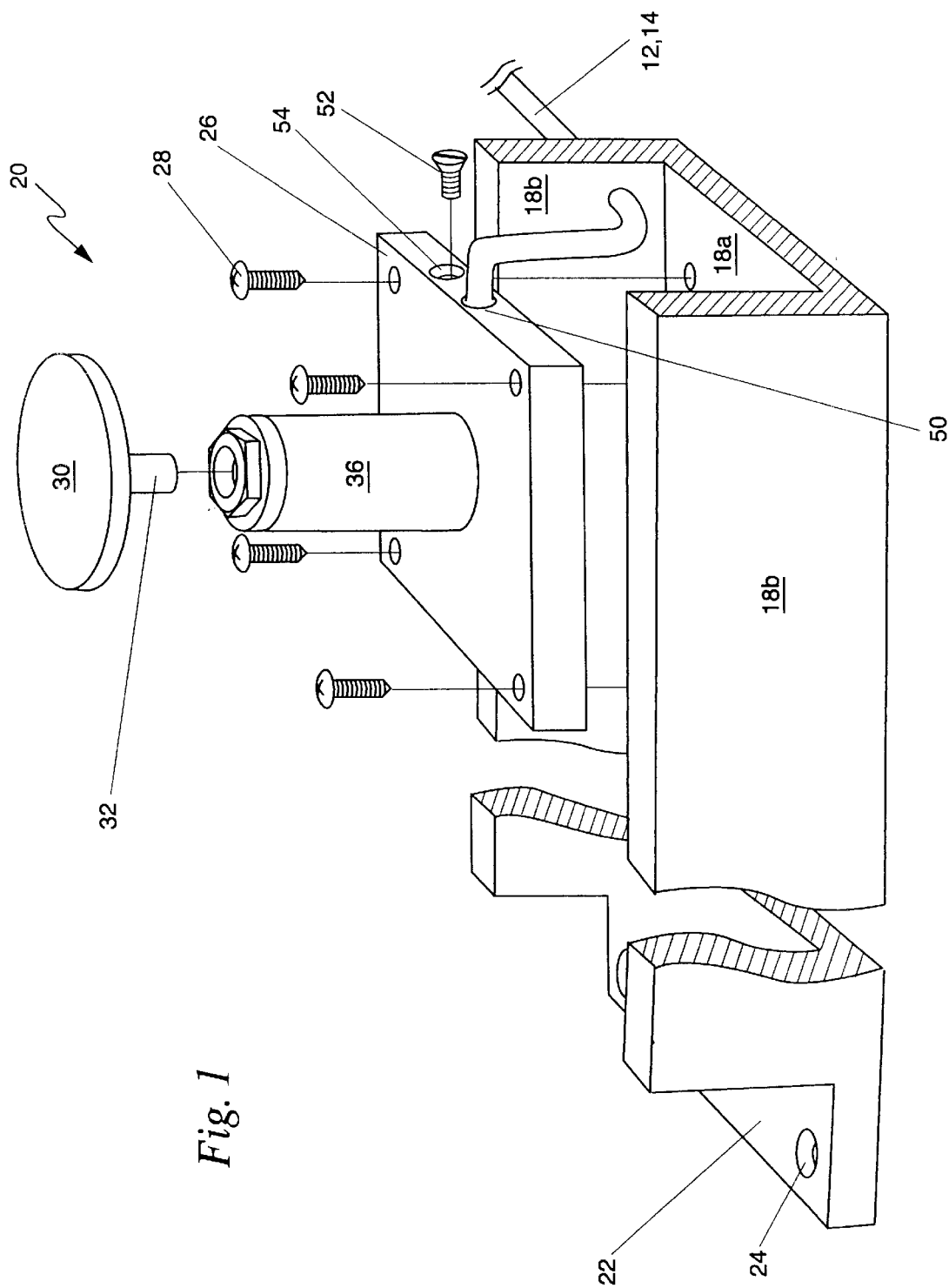
FIG. 1 is perspective view of the air hammer detailing its installation into a U-shaped channel support.
Figure 3:
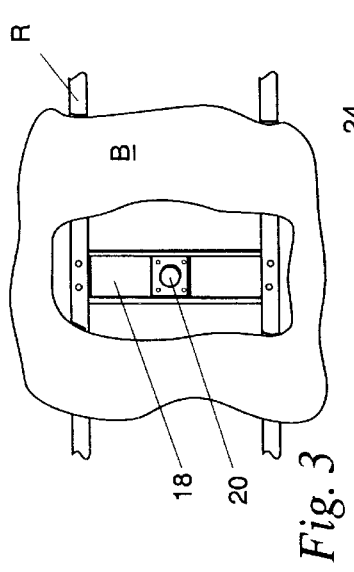
FIG. 3 is a fragmented view looking down from the cargo area of the truck bed having a portion of the bed removed to show the air hammer addressing the truck bed.
Figure 4:
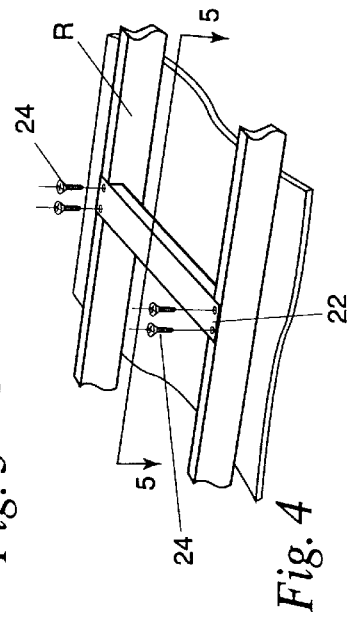
FIG. 4 is a perspective view indicating fastening details of the U-shaped channel support to an under carriage of the cargo bed.

Considering the drawings, wherein like reference numerals denote like parts throughout the various drawing figures, reference numeral 10 is directed to the apparatus according to the present invention.

Figure 2:
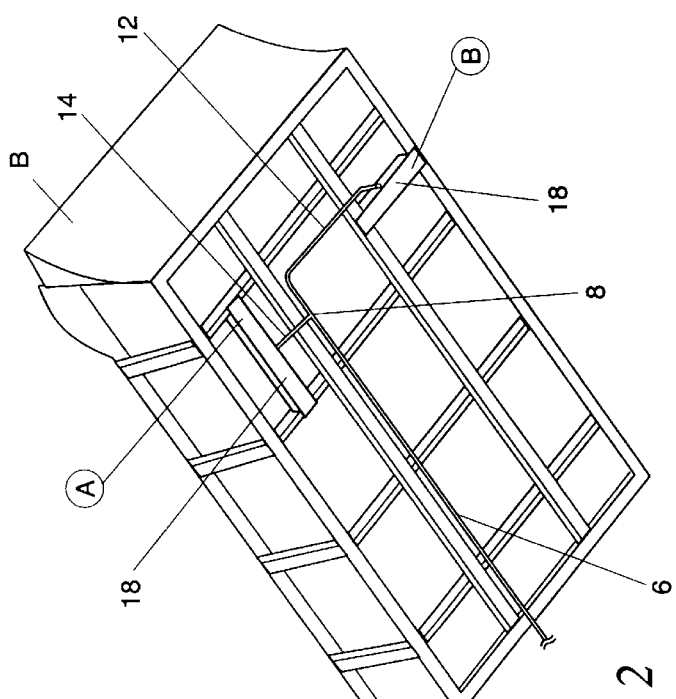
FIG. 2 reflects the deployment of the air hammer strategically to an underside of the cargo bed of the dump truck.
Figure 5:
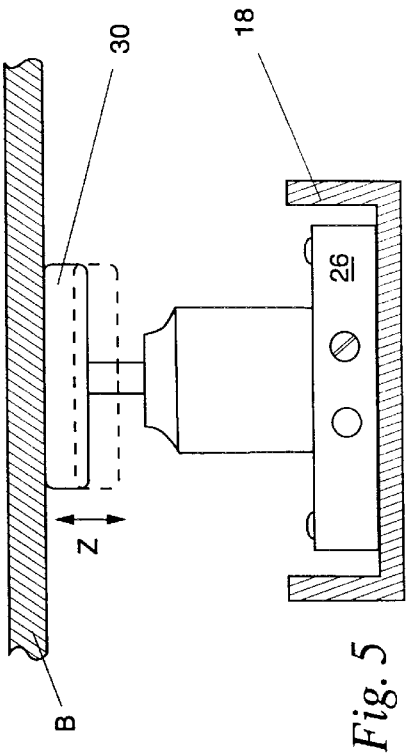
FIG. 5 is a sectional view taken along lines 5—5 of FIG. 4.
Figure 6:
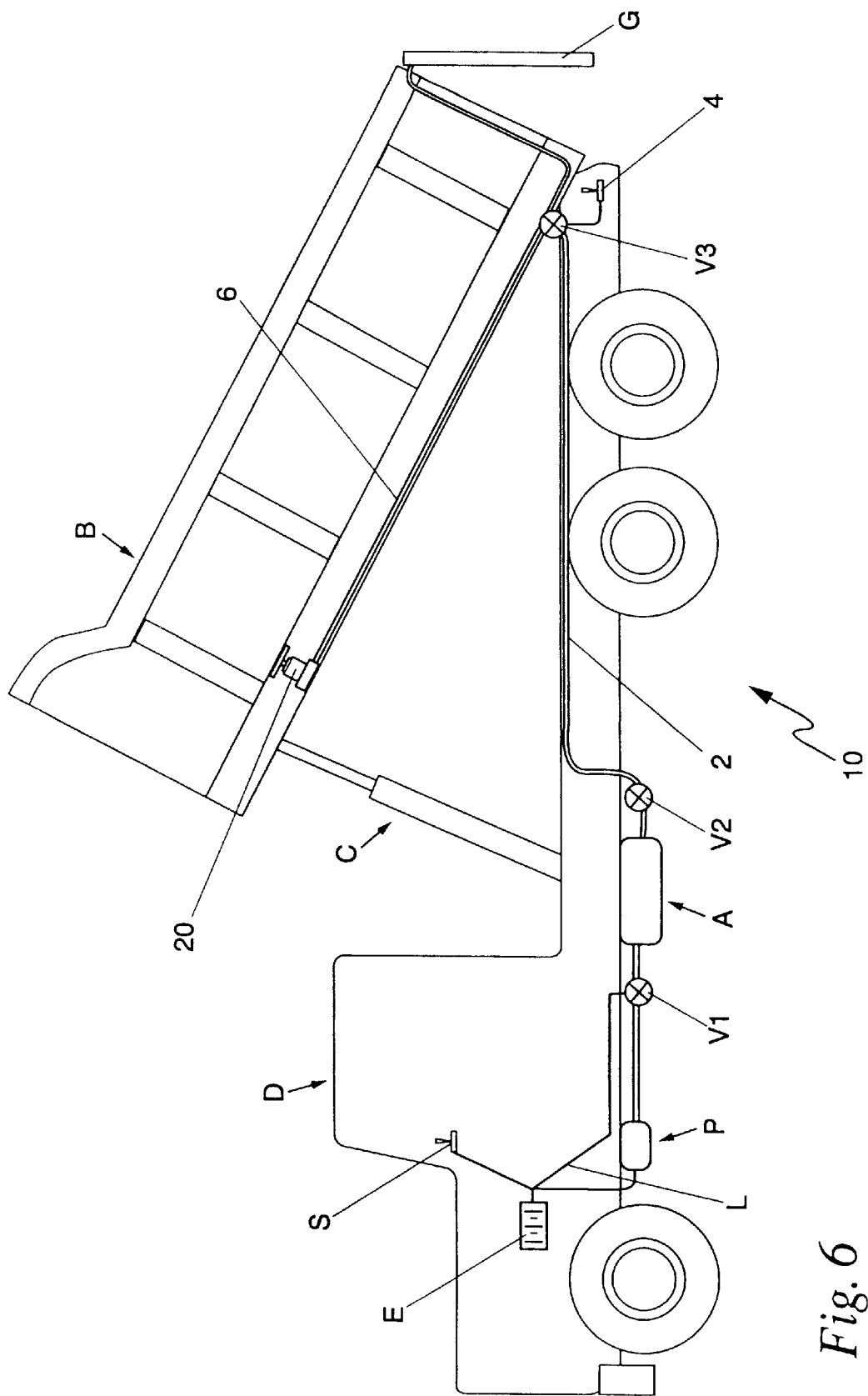
FIG. 6 is a side view of the truck schematically depicting the fluid circuitry of the air line between the air hammer and an existing on board truck air source.

Referring to FIG. 6, the apparatus 10 according to the present invention is shown in its environment. In essence, a dump truck D, having a cargo bed B allows the bed to move from a lowered to a raised position (shown) by means of a cylinder C. The dump truck D normally includes a source of energy E, such as a battery and an engine and the source of energy is operatively coupled between an enabling switch S and an air pump P. The air pump P communicates with an accumulator A controlled by a first valve V1 with the accumulator A optionally protected on a down stream side by a second valve V2. A communicating link L extends from valve V1 back to the source of energy E when the interior pressure of the accumulator A is within acceptable ranges. As the pressure within the accumulator lowers, a signal through the line L commands for the pump P to provide more air. Valve V2 can be manually operated and allows communication of the air through a conduit 2 to a third valve V3 which can be used to operate the gate G of the dump truck. A switch 4 is deployed at the valve V3 and can direct air first to the gate G and second to the air hammer 20 communicating therewith via a conduit 6. FIG. 2 reflects the underside of the bed B and shows conduit 6 communicating to a branch 8 that leads to first and second air lines 12, 14. FIG. 2 also shows channel iron support 18, preferably U-shaped in section and affixed to the underside of the cargo bed B. FIG. 2 shows two possible orientations of the U-shaped channel iron supports 18 in circle A and circle B. One orientation allows the U-shaped iron 18 to be orientated parallel to the long axis of the bed B and the other is transverse thereto. It is preferred that two air hammers are provided per truck cargo bed, one within each of the U-shaped channel supports 18 and that they be placed adjacent a leading edge of the cargo bed and slightly inboard.

FIGS. 1 through 5 show the mounting details of the air hammer 20 both onto the U-shaped channel 18 and onto the underside of the cargo bed B. The U-shaped channel 18 includes a bight portion 18a and two upwardly extending legs 18b. The bight portion 18a, at extremities remote from the central area, project away from the upwardly extending legs 18b to provide a tongue 22 at each end thereof for fastening to the under carriage of the cargo bed B. Holes 24 are located on the tongue 22 to receive bolts 24 fastening to the under carriage of the cargo bed via supporting rails R commonly found on the cargo bed underside.

The air hammer 20 includes a base plate 26 which mounts onto the bight portion 18a of the U-shaped channel within the legs 18b so that it nests within the hollow of the U-shaped channel. The base 26 fastens to the bight portion 18a of the channel by means of fasteners 28. Thus, a hammer head 30 of the air hammer faces an underside of the cargo bed B.

The hammer head 30 of the air hammer 20 is the working surface which pulses against the underside of the cargo bed B. As shown by the dotted lines in FIG. 5, the hammer head 30 reciprocates between the positions shown in solid lines and dotted lines so that repeated blows are provided to the underside of the cargo bed B by motion of a hammer head along the direction of the double ended arrows Z. When the accumulator A of FIG. 6 is delivering approximately 90 pounds per square inch of air pressure, the hammer head 30 will deliver approximately 4500 blows per minute.

Figure 7:
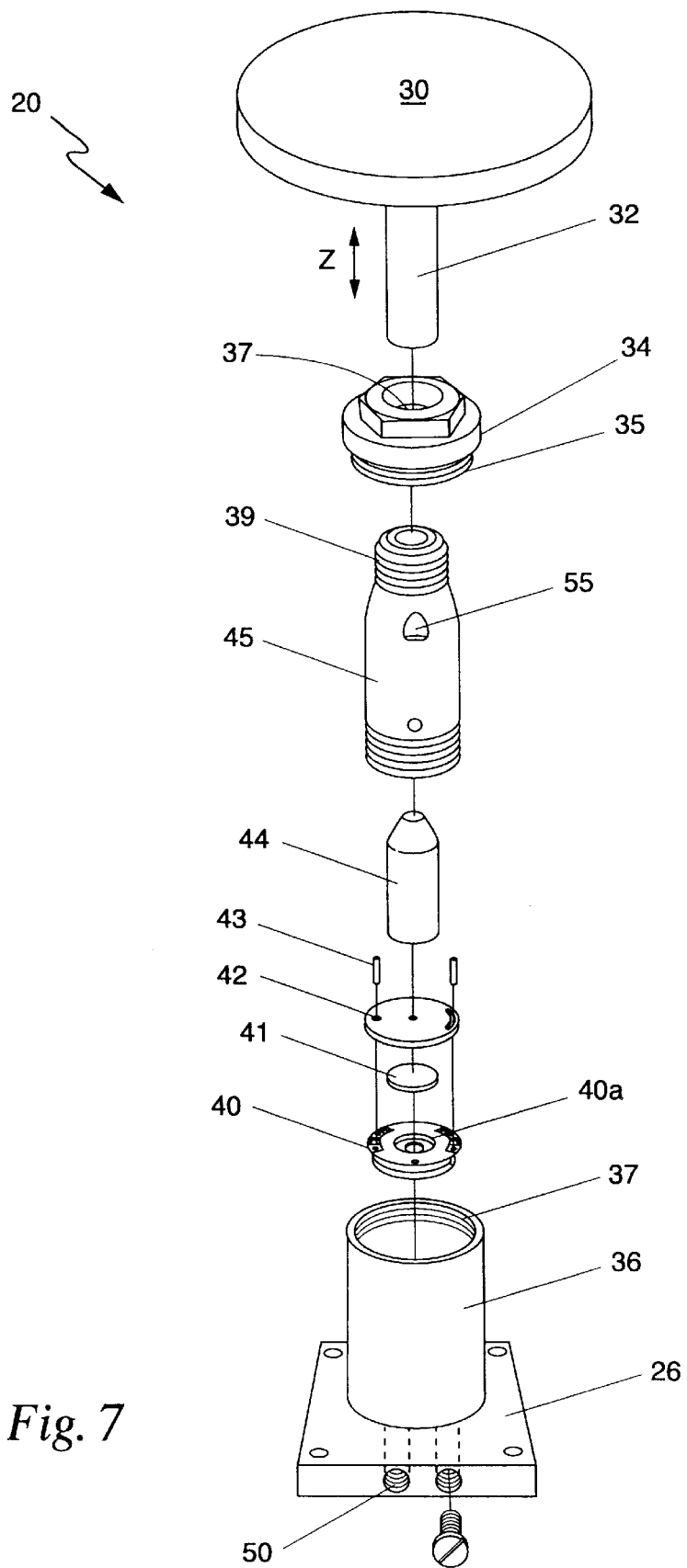
FIG. 7 is a perspective view of the exploded parts of the air hammer according to the present invention.

Once the air system has been enabled, manipulation of valve V3 via the switch 4 will direct air to both air hammers 20. Referring to FIG. 7, the hammer head 30 is disc shaped, connected to a cylindrical hammer stem 32 which is slidably disposed within hollow of a locking nut 34 that threads within a casing 36 that is fixed to the base 26. Threads 35 on the nut 34 engage threads 37 on the casing 36. The interior of the casing 36 includes in ascending order, a circular lower valve case 40, a circular valve disk 41, a circular upper valve case 42, a pair of cylindrical valve pins 43, a cylindrical piston 44 overlying the upper valve case 42 and having a truncated conical top taper, and a cylinder 45 having a hollow bore which is complenentally formed to receive the piston 44 therewithin. The valve pins 43 pass through the upper valve case 42 and extend within the lower valve case 40. Air is admitted into the casing 36 via inlet 50 which communicates with the air lines 12, 14. An air bleed screw 52 is received in a portal 54 and controls back pressure because the portal 54, like the air inlet 50, communicate within the casing. Air admitted within the casing affects the valve disk 41 from its annular seat 40a complementally configured on the lower valve case 40. Upward air pressure is transferred to the piston 44 which causes vertical motion upwardly as shown in FIG. 7. The planar truncated end of the piston, reciprocating in the cylinder 45, directly contacts the flat bottom of stem 32 of the hammer head 30 to provide it with positive vertical translation.

The locking nut 34 has an interior thread 37 which coacts with the thread 39 on the cylinder 45 and secures same. Vertical reciprocation of the stem 32 beyond a certain point allows excess air to pass through portal 55 located on a top portion of the cylinder 45, relieving the air pressure and causing the hammer head 30 to fall downwardly in a negative vertical direction. The repeating pulsing caused by making and braking the fluidic path with the portal 55 provides the high rate of reciprocation.

In use and the operation, the dump truck is taken to a site where the material contained within the cargo bed is to be dumped, the air system is energized, the truck bed is elevated such that it is inclined as shown in FIG. 6, and the gate G is released. Next, the air vibrator is energized to facilitate the removal of truck cargo content from the truck.

Moreover, having thus described the invention, it should be apparent that numerous structural modifications and adaptations may be resorted to without departing from the scope and fair meaning of the instant invention as set forth hereinabove and as described hereinbelow by the claims.

What is claimed is:

1. A kit for installation on a dump truck to facilitate the removal of cargo from a cargo bed of the dump truck comprising, in combination:

an air line communicating from a source of air to an underside of the cargo bed, a support located on the underside of the cargo bed, air hammer means for vibrating said cargo bed deployed between said support and a bottom face of the cargo bed, and means for directing air to said air hammer means.

2. The kit of claim 1 wherein said air hammer means includes a base mounted on said support, a casing extending up from said base and a hammer head deployed adjacent the cargo bed on an underside thereof said hammer head having a stem depending therefrom and extending into said casing.

3. The kit of claim 2 including an air bleed communicating with said casing to control air pressure within an interior of the casing.

4. The kit of claim 3 including said hammer head configured as a substantially circular disk, said stem configured as a substantially cylindrical rod centrally disposed with respect to a center point of said disk, said disk having a diameter which is greater than an exterior periphery of said casing.

5. The kit of claim 4 wherein said stem has a diameter less than a diameter of said casing and is telescopically inserted thereinto via a free end of said stem.

6. The kit of claim 5 wherein said casing support is a substantially square plate upon which said casing is centrally disposed, and said casing support includes an air passageway and said air bleed passageway communicating with said casing.

7. The kit of claim 6 wherein said support plate is mounted within a U-shaped channel, said U-shaped channel having a bight portion upon which said support plate is disposed and said channel includes first and second legs straddling sides of said air hammer.

8. The kit of claim 7 including an extension of said bight area defining a tongue at distal extremities of said channel for fastening to underside rails of the cargo bed.

9. The kit of claim 8 including a piston within said casing which reciprocates within a cylinder, said piston receiving pulses of air by a valve interposed within said casing interior and receiving air from said source.

10. The kit of claim 9 wherein air bleed includes adjusting means.

11. The kit of claim 10 wherein said stem passes within said cylinder and selectively occludes a portal on said cylinder for the rapid pulsing of air therethrough.

12. The kit of claim 11 wherein said piston is substantially cylindrical with a conically tapering top portion which is truncated.

13. The kit of claim 11 wherein said stem sits on said piston top.

14. The kit of claim 13 wherein said cylinder has an upper taper and a portal.

15. The kit of claim 14 including a nut fastened to said cylinder and said casing.

\* \* \* \* \*